United States Patent
Heinrich et al.

(10) Patent No.: US 11,987,304 B2
(45) Date of Patent: May 21, 2024

(54) GENERATING STEERING WHEEL TORQUES AS TACTILE FEEDBACK IN VEHICLE STEERING SYSTEMS

(71) Applicant: Volkswagen Aktiengesellschaft, Wolfsburg (DE)

(72) Inventors: Felix Heinrich, Braunschweig (DE); Dirk Dreyer, Stadthagen (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 214 days.

(21) Appl. No.: 17/329,956

(22) Filed: May 25, 2021

(65) Prior Publication Data
US 2021/0371009 A1   Dec. 2, 2021

(30) Foreign Application Priority Data
May 28, 2020 (DE) .......................... 102020206703.1

(51) Int. Cl.
*B62D 6/00* (2006.01)
*B62D 3/12* (2006.01)
*B62D 5/04* (2006.01)
*B62D 15/02* (2006.01)

(52) U.S. Cl.
CPC .......... *B62D 6/008* (2013.01); *B62D 5/0481* (2013.01)

(58) Field of Classification Search
None
See application file for complete search history.

(56) References Cited

U.S. PATENT DOCUMENTS

| | | | |
|---|---|---|---|
| 2019/0291777 A1* | 9/2019 | Ishio | B62D 5/0463 |
| 2022/0048563 A1* | 2/2022 | Schäfer | B62D 6/008 |
| 2022/0227416 A1* | 7/2022 | Suzuki | B62D 15/025 |

FOREIGN PATENT DOCUMENTS

| | | |
|---|---|---|
| DE | 102014205321 A1 | 9/2015 |
| DE | 102017105370 A1 | 9/2018 |
| DE | 102018123615 A1 | 3/2019 |
| DE | 102017222952 A1 | 6/2019 |
| DE | 102018123291 A1 | 3/2020 |
| DE | 102019214305 A1 | 3/2020 |
| EP | 1554169 B1 | 7/2005 |

* cited by examiner

*Primary Examiner* — Jonathan M Dager
*Assistant Examiner* — Laura E Linhardt
(74) *Attorney, Agent, or Firm* — Peter Zura; LOZA & LOZA, LLP

(57) ABSTRACT

Generating a steering wheel torque (ML) on a steering wheel in a vehicle steering system as a tactile feedback. A value for a rack force (FZ) may be obtained, and at least a component (MZ) of an actuator-generated target steering wheel torque (MS) utilizing a characteristic curve (K1) that defines the steering wheel torque (MS) as a function of the rack force (FZ). A steering wheel torque (ML) is generated on the basis of the target steering wheel torque (MS) using an actuator mechanically connected to the steering wheel. A steering system for a vehicle, and a control unit for such a steering system may be configured to perform the functions disclosed herein.

17 Claims, 2 Drawing Sheets

GENERATING STEERING WHEEL TORQUES AS TACTILE FEEDBACK IN VEHICLE STEERING SYSTEMS

RELATED APPLICATIONS

The present application claims priority to German Pat. App. No. 10 2020 206 703.1, filed May 28, 2020, the contents of which is incorporated by reference in its entirety herein.

FIELD OF TECHNOLOGY

The present disclosure relates to vehicle steering systems for motor vehicles and also for passenger automobiles or trucks. The present disclosure also relates to a method for generating a steering wheel torque (or feedback torque) on the steering wheel as a tactile feedback in a vehicle steering system, a steering system for a vehicle (such as a motor vehicle, e.g., a passenger automobile or a truck) and also a control unit for such a steering system.

BACKGROUND

Steering systems are often used in vehicles with which the driver indicates a steering intention by actuating a steering wheel. The actual effective steering torque or the steering force is then at least partially generated not by the driver but by means of an actuator. With so-called steer-by-wire systems, the steering wheel, and the steering gear assembly coupled to the vehicle wheels, including the actuator, are mechanically decoupled. In this case, the steering torque is generated entirely by actuators and applied to the steering gear assembly on the basis of the manual steering wheel actuation.

There are also so-called superimposed steering systems or electromechanical steering systems. In this case, both an actuator and the steering wheel actuated by the driver are connected to the steering gear assembly and therefor also at least indirectly to one another. The driver thus experiences the torques generated by the actuator at least indirectly as tactile feedback. It is also known in this context that there can be variable gear ratios, e.g., via a planetary gearing between a steering input shaft, to which the steering wheel is connected, and the steering gear assembly. An active torque can be set at the steering wheel as a tactile feedback via an actuator that adjusts the gear ratio, independently of the actuator for generating the steering torque (which drives, e.g., a pinion coupled to a rack).

This does not occur with steer-by-wire systems, due to the mechanical decoupling. Accordingly, there is a separate actuator on the steering wheel (in particular an electric motor), for generating torques on the steering wheel and thus for setting a defined steering feel. The actuator does not drive the steering gear assembly in this case. In particular, the forces that would otherwise exist with a mechanical coupling to the steering gear assembly are simulated therewith.

A solution for a steer-by-wire system is described in DE 10 2018 123 615 A1, in which a steering wheel torque generated by an actuator for obtaining a desired steering feel can be set without taking a force (rack force) acting in the steering gear assembly into account.

It has been shown that it is not always possible with this solution, as well as other known systems, to adjust the tactile feedback, and therefore obtain a desired steering feel with the steering wheel.

SUMMARY

Aspects of the present disclosure are directed to improving the generation of tactile feedback on the steering wheel by actuators in a vehicle steering system, in particular in the form of a (feedback) steering wheel torque generated by actuators.

In some examples, a tactile feedback may be generated on the steering wheel by a steering wheel torque generated by an actuator, wherein the actuator, or the torque it generates, can be transferred mechanically to the steering wheel, for example, due to a mechanical coupling of the actuator and the steering wheel. It is generally intended that the generation of the steering wheel torque is improved thereby, in particular such that a steering feel is obtained therewith that feels natural to the driver. More precisely, it is proposed that the steering wheel torque generated by the actuator is at least partially generated using a characteristic curve that describes the steering wheel torque as a function of a rack force. This solution can be used in principle with both a steer-by-wire system as well as with superimposed steering systems.

The rack may be configured as a mechanical link in the steering gear assembly that can be displaced by the torques that are generated either purely by actuators (in steer-by-wire systems), or by actuators and manually (in superimposed systems). In particular, the rack is displaced linearly, and pivots other mechanical links in the steering gear assembly in the known manner, such that the vehicle wheels are turned when a steering angle is set. The latter takes place in particular about a substantially vertical spatial axis.

Aspects disclosed herein are distinctive in that the actuator-generated steering wheel torque is determined to adjust a steering feel on the basis of a rack force. This rack force can be estimated and/or determined on the basis of a model in the manner described below. One advantage is that by taking this rack force into account, a particularly realistic steering feel can be obtained that reflects the actual operating state and/or mechanical resistance of the steering gear assembly.

It is also advantageously provided in the present disclosure that the steering wheel torque generated by an actuator is determined by means of a characteristic curve, when the rack force is known. The characteristic curve defines the relationship the steering wheel torque to the rack force, or its dependency thereon. Advantages are obtained with regard to the speed with which the curve is obtained for determining the steering wheel torque that is to be generated, because this only requires a relatively short computing time.

BRIEF DESCRIPTION OF THE DRAWINGS

Exemplary embodiments of the present disclosure shall be explained below in reference to the attached, schematic drawings. Therein.

DETAILED DESCRIPTION

Figure 1:
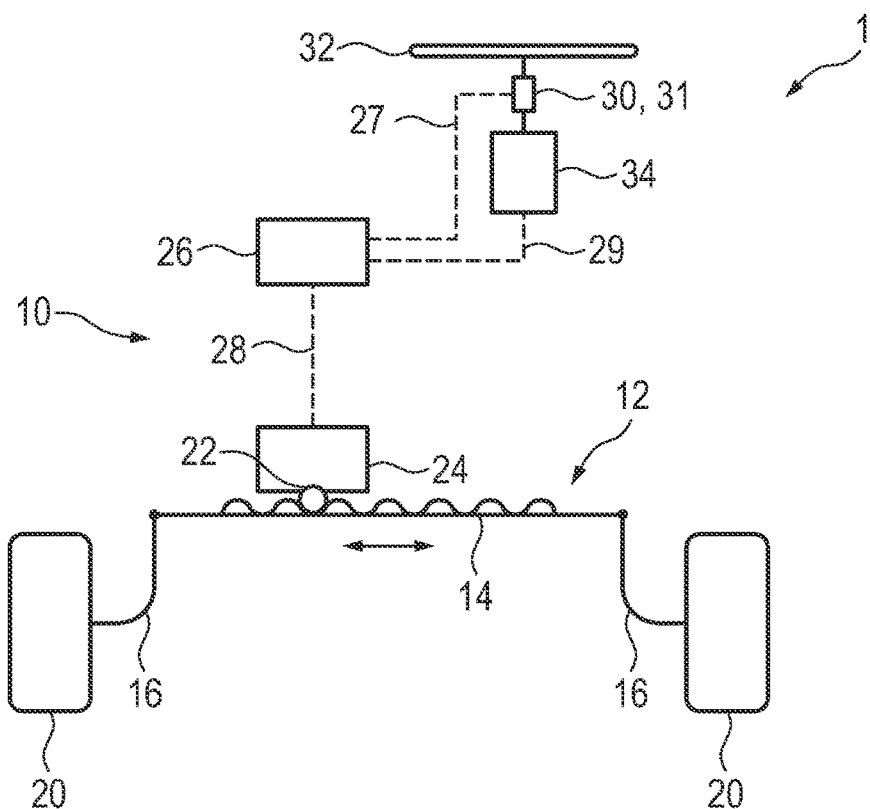
FIG. 1 shows a steering system according to some aspects of the present disclosure.

In some examples, the present disclosure illustrates methods for generating a steering wheel torque on the steering element (e.g., a steering wheel) in a vehicle steering system as tactile feedback. The method may include obtaining a value for a rack force (e.g. from a valuator or a model); determining at least one component of a target steering wheel torque (generated by an actuator) by means of a characteristic curve that defines the steering wheel torque as a function of the rack force; and generating (or setting) the steering wheel torque on the basis of the target steering wheel torque by means of an actuator that is mechanically connected to the steering wheel.

The rack may be configured as a part of a steering gear assembly in the vehicle steering system of the type described above. In some examples, the rack force may not be measured directly by sensors, but instead is determined by means of a respective valuator implemented with a computer, or a model, with which sensor measurement values are otherwise obtained.

In some examples, a value for the rack force is determined by means of a valuator (which can be, for example, a tangibly-embodied software component or a general function of a control unit in the vehicle steering system), which may obtain operating values for an actuator mechanically coupled to the rack (such as an electric motor). In some examples, the value may be a motor current from a motor that is configured to displace the rack by applying a motor torque. Additionally or alternatively, the valuator can include a model of the steering gear assembly that obtains the motor torque generated by the motor as an input value. The model may be configured to simulate, for example, the inertia and/or friction within the steering system.

In some examples, the rack force can be determined directly by means of a rack force model. This can be obtained in the form of input values, e.g., the speed of the vehicle and a steering angle set by the driver.

The characteristic curve can be described and/or stored as a mathematical function, tangibly embodied in harware. It can also be defined by a dataset and/or a table containing preferred value pairs of (target) steering wheel torques and rack forces. By way of example, the characteristic curve can be stored in a memory in the control unit described below.

The actuator for generating the steering wheel torque can be configured as an electric motor. This can be the actuator that can set the gear ratio in the manner describe herein in a superimposed steering system. It can also be an actuator that displaces the rack in a superimposed steering system. These two actuators can also at least partially generate the steering wheel torque. In the case of a steer-by-wire steering system, this can be the actuator that is mechanically coupled to the steering wheel, but not to the rack.

In general, in any of the examples described herein, variations and explanations specified can relate to both a superimposed steering system as well as a steer-by-wire steering system, or be provided therein, as long as not otherwise specified or apparent. Accordingly, the vehicle steering system of the type specified herein can also be limited to any of these variations, e.g., it can therefore be configured as a superimposed steering system or a steer-by-wire steering system.

In some examples, the vehicle steering system may also configured be configured to generate a rack actuation torque, or a steering support torque, with the actuator, by means of another characteristic curve, wherein the characteristic curve defines the relationship between the steering support torque and a steering wheel torque generated by the driver (also referred to as a manual torque). This characteristic curve, described above, may be configured as an inverted variation of the other characteristic curve, relating to the rack force. A (first) characteristic curve, relating to the rack force, can substantially be configured as the inverse of the other characteristic curve. The curve is understood in general to describe the type and/or form of the characteristic curve, e.g., a linear, exponential, quadratic, leveling, or saturated curve. In some examples, this can relate to rates of change or a gradient of the curve, or the curve can be defined by these values.

In general, the characteristic curve can be defined in relation to the rack force, such that as the rack force increases, the actuator-generated (target) steering wheel torque also increases. In contrast, the other characteristic curve may indicate that there are high steering support torques with low driver-generated steering wheel torques, which then decrease as the driver-generated steering torques increase. This can correspond to the inverted curve of the characteristic curve specified above, in that the relationship between the respective steering wheel torque and the other values forming the characteristic curve is defined as their being opposite to one another.

Such configurations may be advantageous in that the other characteristic curve for determining a steering support torque is already available for numerous steering systems, or can be easily determined, such that it is easier to define a characteristic curve for the actuator-generated (target) steering support torque. The steering support torque can act on the steering gear assembly, or displace a rack, in the known manner.

In some examples, a torque resulting from damping, and/or a torque resulting from friction, are determined as a further component of the (feedback) actuator-generated steering wheel torque. The damping and friction can occur in the steering gear assembly, or simulate the damping and friction ratios therein.

In general, any of the components of the actuator-generated (target) steering wheel torques can be determined substantially simultaneously, and then combined, e.g., via a sum node. The resulting combined actuator-generated (target) steering wheel torque can then form a target value, or a general default value, implemented by the actuator.

The damping and/or frictional torques can likewise be determined by means of a respective characteristic curve or a model. Theses can each obtain a change in the steering angle, in particular at the steering wheel and/or a steering input shaft connected thereto, as the input value. The friction, or the torque resulting therefrom, can increase as the change in the steering angle increases, until preferably reaching a saturation value. The damping, or the torque resulting therefrom, can likewise increase as the change in steering angle increases, in particular proportionally.

In particular, the torques resulting from friction and/or damping are each determined with a characteristic curve that defines the relationship of the torque to the damping and/or friction.

By taking the damping and friction into account, a more realistic steering feel can be set. By using characteristic curves, new advantages are obtained with regard to increased computing speeds or reduced computing.

In some examples, a return torque, with which the steering wheel can be returned to a predefined position, may be determined as another component of the actuator-generated target steering wheel torque. This position can be a neutral position, in particular when driving along a straight line. This may also improve the steering feel.

The target steering wheel torque may be set with a control unit, or a control value. In some examples, the actuator-generated (target) steering wheel torque is used instead as a target value for controlling the generation of a torque acting on the steering wheel. It may be used as a target steering wheel torque for regulating the actuator-generated (feedback) torque.

With a corresponding control, the precision when setting the steering feel, or a reasonable feedback torque, may be improved.

Furthermore, a torque acting on the steering wheel can be detected with sensors as an actual value for the control. This can be obtained from the manual torque applied by the driver and/or an active actuator-generated steering wheel torque.

In another variation, the control is a state control, which preferably obtains a steering wheel angle and/or the torque detected with sensors (in particular the manual torque) as state variables. It has been shown that such a state control is particularly advantageous in setting the desired steering feel. Alternatively, a PID controller can also be used.

The controllers, controls, or control modes specified herein can be provided by a control unit, in particular the actuator, which may be configured with software for these functions.

In some examples, the present disclosure is directed to a steering system for a vehicle, comprising a steering element, in particular a steering wheel, by means of which a driver's steering intention can be defined; an actuator (such as an electric motor, which may or may not be connected to the rack or a steering gear assembly in general), mechanically connected to the steering wheel; a rack, configured as part of a steering gear assembly coupled to the vehicle wheels; a control unit (such as a digital and/or electronic control unit), configured to determine at least one component of an actuator-generated target steering wheel torque by means of a characteristic curve, wherein the characteristic curve defines a relationship between the target steering wheel torque and a rack force, and is configured to control the actuator in order to generate the target steering wheel torque.

The control unit may include a processor and/or a memory. Program instructions can be stored on the memory, with which the control unit controls any of the functions and measures specified herein when executed by the processor. The control of the actuator can include controlling associated power electronics.

The present disclosure also relates to a control unit for a steering system according to any of the aspects disclosed herein.

Generally, the steering system and the control unit can be configured to execute a method according to any of the aspects specified herein. It can include any other features, developments and variations that result in all of the operating states specified herein. All of the examples and developments of the features of the method can also relate to or be provided with the features of the steering system and the control unit that have the same descriptions or are of the same type.

FIG. 1 shows a steering system 10 in a vehicle 1, where the steering system 10 is configured as a steer-by-wire system. It comprises a steering gear assembly 12 with a rack 14. The rack 14 is connected to the vehicle wheels 20 on a front axle of the vehicle 1 via other links 16 in the steering gear assembly 12, not shown in greater detail for the sake of brevity. A pinion 22 on an actuator 24, which may be configured as an electric motor (referred to below as the motor 24) engages with the rack 14. The motor 24 drives the pinion 22, such that it rotates on the rotational axis at the leaf level. The rack 14 can consequently be displaced linearly in the direction of the double arrow, which can then be applied by means of the mechanical links 16 in the known manner to turn the vehicle wheels 20 to set a steering angle.

The steering system 10 may also include a control unit 26. This may be connected to the motor 24 via a connection 28, indicated by a broken line, for transmitting control signals for actuating the rack 14. The control unit 26 may also be connected to a sensor 30 (see data line 27), which may be mechanically coupled to a steering element 32 (a steering wheel). The sensor 30 may be configured to detect a steering angle defined by the steering wheel 32, as and may also detect steering angle changes, which may be transmitted to the control unit 26 in order to control the motor 24 to set the predefined steering angle.

In some examples, the steering wheel 32 may not be mechanically connected to the steering gear assembly 12, and the rack 14. Instead, it may be connected to another actuator 34 (also in the form of an electric motor). The electric motor 34 may be configured to generate an actuator-generated steering wheel torque that acts on the steering wheel 32 as a tactile feedback. The latter can take place through the control by the control unit 26. A corresponding data line 29 is indicated by a broken line in the figure. In some examples, the data lines 27, 28, 29 can be contained in a communication bus.

When in operation, the control unit 26 is configured to determine a rack force, e.g., by means of a valuator, as described above, and/or a model. The control unit can obtain the input values for the valuator or the model described in the general description above for this, e.g., through a connection to other sensors that measure these values. A characteristic curve is also stored in the control unit 26, which may define the target steering wheel torque generated with the actuator 34 as a function of a rack force. The control unit 26 is configured to control the actuator 34 after determining the corresponding rack force to generate the target steering wheel torque defined by the characterizing curve.

Figure 2:
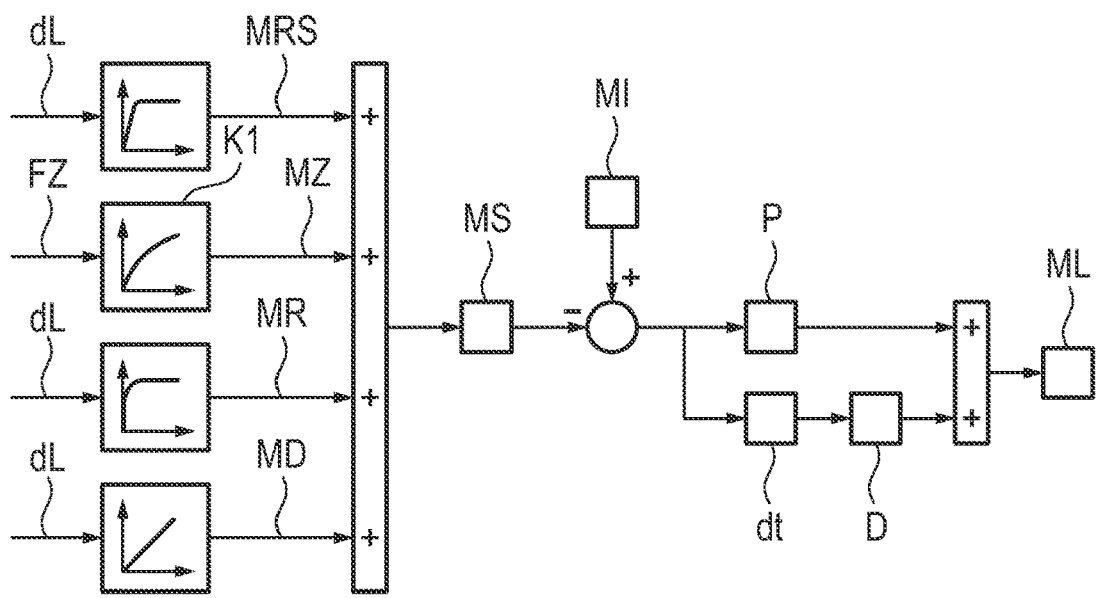
FIG. 2 shows a control scheme implemented by the steering system, in a schematic illustration according to some aspects.

As shown in the example of FIG. 2, this may take place in the framework of a regulation executed by the control unit 26.

The control unit 26 may also be configured to determine another characteristic curve for a steering support torque that is to be generated by the motor 24 and applied to the rack 14 as a function of the value obtained from the sensor 30. These characteristic curves can differ from one another in the manner described above, in that they are configured as the inverse of one another.

A control process is illustrated in FIG. 2, with regard to how the control unit 26 may generate the steering wheel torque ML with the actuator 34, in order to obtain a defined steering feel. In this example, components of an actuator-generated target steering wheel torque MS are first determined for this, wherein this target steering wheel torque MS represents a target value for the control. The resulting, or actual, steering wheel torque set by the actuator according to the control is referred to as the resulting steering wheel torque ML.

The components of the (target) steering wheel torque MS includes a return torque MRS, a rack torque MZ, a frictional torque MR, and a damping torque MD. These torques each represent torques obtained from the specified values or physical relationships that can be discerned by the driver in a conventional actuation of the steering gear assembly 12 with the steering wheel 32 (e.g., with a mechanical connection between the steering wheel 32 and the steering gear assembly 12) in the expected manner.

In this example, the active return torque MRS is obtained in that the change in the steering angle dL measured by the sensor 30 is added to a characteristic curve with which the torque MRS is obtained. These and the other characteristic curves shown in FIG. 2 plot the input values along the x-axis, and the components of the torque, or the respective torque, are plotted on the y-axis.

The torque MZ obtained from the rack force is determined by means of a characteristic curve K1. This obtains the rack force FZ as an input value, obtained or acquired in the manner described above from a model or a valuator. The torque MR obtained from the friction is determined by means of a characteristic curve, which then obtains the change in steering angle dL as the input value. In some examples, the characteristic curves, except those for the damping torque MD, flatten out, or become saturated, after an initial abrupt rise, in particular logarithmically. In contrast, a proportional characteristic curve is provided for the damping torque MD.

These torque components MRS, MZ, MR, MD may be combined to obtain the target steering wheel torque MS. Furthermore, an actual torque MI acting on the steering wheel 32 is also measured by means of a torque sensor 31, which can be integrated in the sensor 30 in a steering wheel 32, or provided separately. This is the torque currently acting on the steering wheel 32, which is composed of a manual torque by the driver and a currently existing torque generated by the actuator 34. A control offset is formed in the known manner from the actual torque MI and the target torque MS. This is sent to a controller, indicated schematically, in the form of a PID controller, that then outputs the aforementioned final or resulting steering wheel torque ML in the known manner, as an output or actuating value.

As specified above, there can also be a state controller, in addition to the PID controller, shown by way of example. In addition to the actual torque MI, at least one of the following values can also be taken into consideration as a state value, and fed back in particular: the temporal derivation of MI, the torque ML of the actuator, the rotational angle of the actuator.

Figure 3:
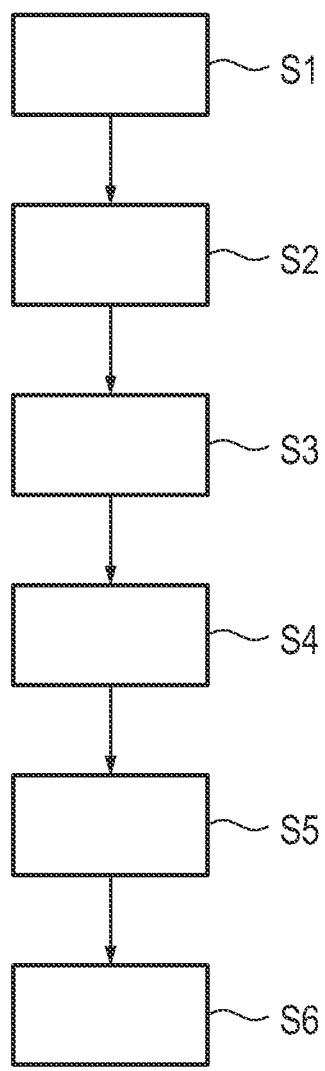
FIG. 3 shows an illustrative flow chart for a process according to some aspects, as executed by the steering system of FIG. 1.

A flow chart for the method according to the present disclosure is shown in FIG. 3, illustrating how a method is carried out by the steering system 10 in the manner described above.

The (target) steering wheel torque MS is determined in a first step S1. The rack force FZ is obtained or determined for this in the aforementioned manner. At the same time, or parallel thereto (or previously) the change in steering angle dL is determined in another step S2. The torque components MRS, MZ, MR, and MD are subsequently determined in a third step S3. The exact sequence in which the steps S1 to S3 are executed may be altered. In some examples, the torque components MRS, MZ, MR and MD can also be determined at slightly different times, or substantially simultaneously. In a fourth step S4, the target steering wheel torque MS may be obtained by combining the torque components MRS, MZ, MR, and MD. This is then subtracted in a further step S5 from an actual torque MI measured with a sensor, and sent to the PID controller shown in FIG. 5. The subsequently obtained resulting steering wheel torque ML is then set in another step S6 by the actuator 34 controlled by the control unit 26.

LIST OF REFERENCE SYMBOLS 1 vehicle
10 vehicle steering system
12 steering gear assembly
14 steering rod
16 mechanical link
20 vehicle wheel
22 pinion
24 motor
26 control unit
27, 28, 29 data connections
30, 31 sensors
32 steering wheel
34 actuator
MS (target) steering wheel torque
MI actual torque
ML resulting steering wheel torque
MRS return torque
MZ torque from rack force
MR frictional torque
MD damping torque
FZ rack force
dL change in steering angle
K1 characteristic curve

The invention claimed is:

1. A method for generating a steering wheel torque as tactile feedback on a steering wheel of a vehicle steer-by-wire steering system, comprising:
    obtaining a value for a rack force associated with the steer-by-wire steering system;
    determining at least a portion of an actuator-generated target steering wheel torque for generating tactile feedback to simulate inertia and/or friction within the steer-by-wire steering system, utilizing a characteristic curve that defines the steering wheel torque as a function of the rack force;
    generating, via an actuator coupled to the steering wheel, the tactile feedback based on the defined steering wheel torque on the basis of the target steering wheel torque; and
    generating, via the vehicle steer-by-wire steering system, a steering support torque using another characteristic curve that defines a relationship of a steering support torque to a driver-generated steering wheel torque, wherein the characteristic curve relating to the rack force is substantially the inverse of the another characteristic curve.

2. The method according to claim 1, further comprising determining a torque resulting from damping, and/or a torque resulting from friction as a further component of the target steering wheel torque.

3. The method according to claim 2, wherein the determining of the torque resulting from damping, and/or the torque resulting from friction comprises using a characteristic curve that defines a relationship between the torque and the damping and/or friction.

4. The method according to claim 1, further comprising determining a return torque as a further component of the actuator-generated target steering wheel torque, with which the steering wheel can be returned to a predefined position.

5. The method according to claim 1, further comprising using the actuator-generated target steering wheel torque as the target value for a control to generate a torque acting on the steering wheel for the tactile feedback.

6. The method according to claim 5, further comprising detecting, via sensors, an actual value as the value for the control of the torque acting on the steering wheel.

7. The method according to claim 6, wherein the control of the torque acting on the steering wheel comprises a state control, comprising state values of a steering wheel angle and the sensor-detected torque.

8. A vehicle steer-by-wire steering system, comprising:
a steering wheel;
an actuator mechanically connected to the steering wheel configured to generate steering wheel torque;
a rack; and
a control unit, wherein the control unit and actuator are configured to
   obtain a value for a rack force associated with the steer-by-wire steering system;
   determine at least a portion of an actuator-generated target steering wheel torque for generating tactile feedback to simulate inertia and/or friction within the steer-by-wire steering system, utilizing a characteristic curve that defines the steering wheel torque as a function of the rack force;
   generate the tactile feedback based on the defined steering wheel torque on the basis of the target steering wheel torque; and
   generate a steering support torque using another characteristic curve that defines a relationship of a steering support torque to a driver-generated steering wheel torque, wherein the characteristic curve relating to the rack force is substantially the inverse of the another characteristic curve.

9. The vehicle steer-by-wire steering system according to claim 8, wherein the control unit and actuator are configured to determine a torque resulting from damping, and/or a torque resulting from friction as a further component of the target steering wheel torque.

10. The vehicle steer-by-wire steering system according to claim 9, wherein the control unit and actuator are configured to determine the torque resulting from damping, and/or the torque resulting from friction by using a characteristic curve that defines a relationship between the torque and the damping and/or friction.

11. The vehicle steer-by-wire steering system according to claim 8, wherein the control unit and actuator are configured to determine a return torque as a further component of the actuator-generated target steering wheel torque, with which the steering wheel can be returned to a predefined position.

12. The vehicle steer-by-wire steering system according to claim 8, wherein the control unit and actuator are configured to use the actuator-generated target steering wheel torque as the target value for a control to generate a torque acting on the steering wheel for the tactile feedback.

13. The vehicle steer-by-wire steering system according to claim 12, further comprising sensors for detecting an actual value as the value for the control of the torque acting on the steering wheel.

14. The vehicle steer-by-wire steering system according to claim 13, wherein the control of the torque acting on the steering wheel comprises a state control, comprising state values of a steering wheel angle and the sensor-detected torque.

15. A method for generating a steering wheel torque as tactile feedback on a steering wheel of a vehicle steer-by-wire steering system, comprising:
   obtaining a value for a rack force associated with the steer-by-wire steering system;
   determining at least a portion of an actuator-generated target steering wheel torque for generating tactile feedback to simulate inertia and/or friction within the steer-by-wire steering system, utilizing a characteristic curve that defines the steering wheel torque as a function of the rack force;
   generating a steering support torque using another characteristic curve that defines a relationship of a steering support torque to a driver-generated steering wheel torque, wherein the characteristic curve relating to the rack force is substantially the inverse of the another characteristic curve; and
   generating, via an actuator coupled to the steering wheel, the tactile feedback based on the defined steering wheel torque on the basis of the target steering wheel torque and steering support torque.

16. The method according to claim 15, further comprising determining a torque resulting from damping, and/or a torque resulting from friction as a further component of the target steering wheel torque.

17. The method according to claim 15, further comprising detecting, via sensors, an actual value as the value for the control of the torque acting on the steering wheel.

* * * * *